United States Patent

[11] 3,568,054

| [72] | Inventor | Wallace A. Ross |
| | | Los Altos, Calif. |
| [21] | Appl. No. | 704,453 |
| [22] | Filed | Feb. 9, 1968 |
| [45] | Patented | Mar. 2, 1971 |
| [73] | Assignee | Hewlett-Packard Company |
| | | Palo Alto, Calif. |

[54] PULSE HEIGHT SPECTRUM ANALYSIS METHOD AND MEANS
3 Claims, 1 Drawing Fig.

[52] U.S. Cl.................................................... 324/77, 250/71.5
[51] Int. Cl..................................................G01j 39/18, G01t 1/20, G01n 23/10
[50] Field of Search........................................... 324/77 (A), C.3; 250/71.5

[56] References Cited
UNITED STATES PATENTS

| 2,962,625 | 11/1960 | Berwin et al.................. | 324/77 (C-S)X |
| 3,270,205 | 8/1966 | Ladd et al..................... | 324/77 (A)UX |
| 3,317,832 | 5/1967 | Webb........................... | 324/77 (A) |

Primary Examiner—Edward E. Kubasiewicz
Attorney—A. C. Smith

ABSTRACT: The total number of occurrences of pulse heights are stored in a multichannel storage device and are displayed in the form of a spectrum. At least one generated reference pulse is provided for identifying a portion of the spectrum to be analyzed. The pulse heights and the generated reference pulse are processed by the same equipment so that to analyze a selected portion of the spectrum the required settings of the base line or gain control or any other parameters which are sensitive to pulse height are found by using the generated reference pulse display lines as a guide.

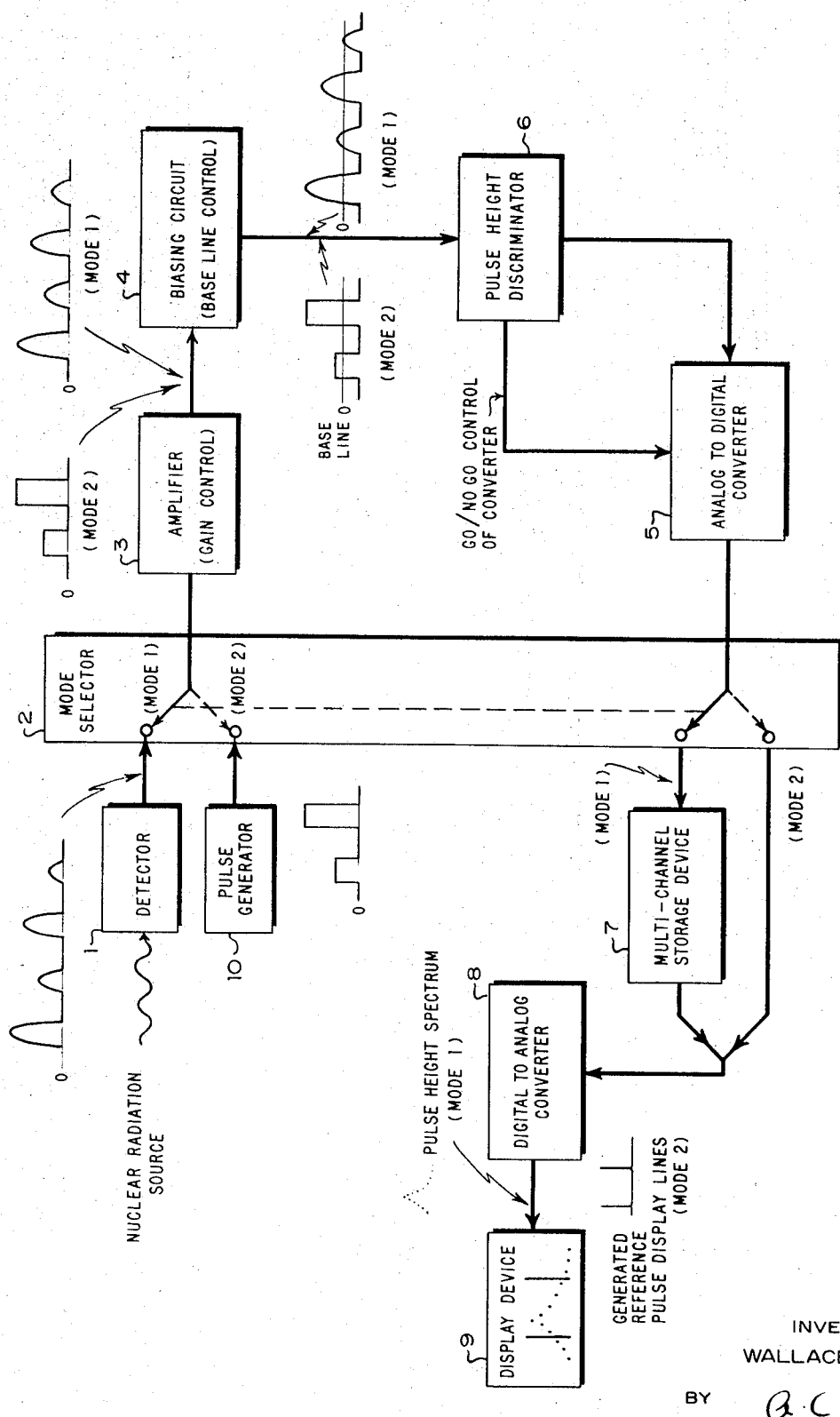

PULSE HEIGHT SPECTRUM ANALYSIS METHOD AND MEANS

BACKGROUND OF THE INVENTION

Pulse height spectrum analysis has been tedious and time consuming in the past since, in order to increase the resolution of a portion of the spectrum, appropriate settings of base line and gain control, and other parameters sensitive to pulse height were found by trial and error.

SUMMARY OF THE INVENTION

Accordingly, in the illustrated embodiment of the present invention, trial and error techniques for determining appropriate base line and gain control settings are eliminated by generating at least one reference pulse which is processed by the present invention operating with the same settings of selected parameters as are used to process the data pulses.

The appropriate settings of base line, gain control or other parameters which are sensitive to pulse height are thus readily found using the reference pulse so that a selected portion of the spectrum may be displayed with increased resolution.

BRIEF DESCRIPTION OF THE DRAWING

The FIG. is a schematic diagram of the circuit of the present invention.

DESCRIPTION OF THE PREFERRED EMBODIMENT

Referring to the FIG., there is shown a mode selector 2 which selects either one of two modes of circuit operation. In mode 1, pulses produced by the detector 1 which are representative of the detection of nuclear radiation or data pulses from any other source are applied through the mode selector 2 to the amplifier 3. The base line of the resulting amplified pulses is then determined by the biasing circuit 4. The biased pulses are applied to the analogue to digital converter 5 through the pulse height discriminator 6 which is a typical go, no-go device. The range of pulse height values which are converted into digital values by the analogue to digital converter 5 is determined by the settings of the pulse height discriminator 6. If the height of a pulse applied to the analogue to digital converter 5 falls within the range of pulse heights selectively set by pulse height discriminator 6, the pulse height discriminator 6 permits the analogue to digital converter 5 to convert the pulse height into a corresponding digital pulse height value. The applied pulse height is not converted if it does not fall within the allowable range of pulse height values determined by the settings of the pulse height discriminator 6. The digital pulse height values of these converted pulse heights are represented by channels in the multichannel storage device 7 such that the lowest digital pulse height value is represented by the storage channel with the lowest address. The number of occurrences of each pulse height is totaled and stored as a digital value in that storage address corresponding to the appropriate digital pulse height value. The resulting information is then applied to the digital to analogue converter 8 in which each digital pulse height value or channel address is converted into an abscissa value for display on a display device 9 such as an oscilloscope and the total number of occurrences of each pulse height is converted into a corresponding ordinate value for the display. The resulting display is a spectrum representing the pulse heights and total number of occurrences of each such pulse height.

In mode 2, at least one reference pulse of chosen magnitude is generated in the pulse generator 10. This generated reference pulse is applied through the mode selector 2 to the amplifier 3. The resulting generated reference pulse is then applied to the biasing circuit 4 which sets the base line. The reference pulse at the output of biasing circuit 4 is then applied through the pulse height discriminator 6 to the analogue to digital converter 5 where it is converted into a corresponding digital value. This operation in mode 2 does not effect the contents of the multichannel storage device 7 stored during mode 1. The digital value of the resulting generated reference pulse is then applied to the digital to analogue converter 8 for display on the display device 9. The reference pulse is thus displayed as a vertical line at a location on the spectrum which corresponds to a particular pulse height. This displayed vertical line is referred to hereinafter as a generated reference pulse display line. The pulse height generator 10 may be adjusted to determine the initial height of the generated reference pulse. Increasing the height of the reference pulse causes the generated reference pulse display line to shift to the right on the display device 9 and decreasing the height of the reference pulse causes the generated reference pulse display line to shift to the left on the display device 9. If two reference pulses of different heights are generated, the resulting generated reference pulse display lines for given settings of base line and gain control occupy different positions on the display device 9 and their spacing is proportional to the difference in their pulse heights. The generated reference pulse display line corresponding to the smaller generated reference pulse occupies a position to the left of the generated reference pulse display line corresponding to the larger generated reference pulse. As the height of one of the generated reference pulses is varied, the corresponding generated reference pulse display line moves as described above. As the setting of the biasing circuit 4 is varied, both generated reference display lines move to the left for more negative biasing and to the right for more positive biasing while maintaining the same spacing with respect to each other since the biasing does not affect the relative difference in height between the two generated reference pulses. As the gain control of the amplifier 3 is varied, both generated reference pulse display lines move to the left for lower gain and to the right for higher gain. However, the spacing between the reference pulse display lines varies because the absolute magnitudes of the amplified reference pulses change even though the percentage change in height is the same for both generated reference pulses.

Thus, in mode 1, the total number of occurrences of pulse heights are stored and displayed in the form of a spectrum. In mode 2, the same base line and gain control settings are used to display the generated reference pulse display lines. The generated reference pulse height is varied until the associated generated reference pulse display line locates an end point of a selected portion of the spectrum to be analyzed. If two generated reference pulses are used, the second generated reference pulse display line is used to locate the other end point of the selected portion of the spectrum to be analyzed.

In order to increase the resolution of the selected portion of the spectrum, a greater number of storage channels are used then were previously used. Thus the base line and gain control settings are adjusted so that the generated pulse display lines encompass more channels on the display than were previously encompassed. Since these adjustments are made during the made 2 of operation, they have no effect on the pulse height and total number of occurrences of pulse heights originally stored in the multichannel storage device 7 during the mode 1 of operation. When the system is switched back into mode 1, new pulse heights and occurrences of pulse heights are detected, amplified, biased, converted, stored, reconverted, and displayed as described above. However, only those pulses of pulse height values corresponding to values which fall within the selected portion of the original spectrum are stored and displayed within the channels encompassed by the newly positioned generated reference pulse display lines, thereby increasing the resolution of the selected portion of the spectrum. By reversing the procedure outlined above, the resolution of a displayed portion of a spectrum may be decreased in order to allow more of the total spectrum to be displayed.

I claim:

1. A method of analyzing a spectrum representing pulse heights and the total number of occurrences of said pulse heights, said method comprising the steps of:

storing a first spectrum in a plurality of storage channels, each channel corresponding to a different pulse height in the first spectrum;

generating at least one reference pulse;

adjusting the height of said reference pulse to correspond to an end point of a selected portion of the first spectrum; and storing a second spectrum representing those pulse heights and the total number of occurrences of each pulse height which occur in said selected portion of the first spectrum in a greater number of storage channels then previously used to store the first spectrum, thereby increasing the resolution of said selected portion.

2. Apparatus for analyzing a spectrum representing pulse heights and the total number of occurrences of said pulse heights, said apparatus comprising:

a detector to receive applied signal for producing pulses of heights and occurrences of said pulse heights representative of the applied signal;

an amplifier with a variable gain control capable of amplifying pulses applied thereto;

generating means for generating at least one reference pulse representative of an end point of a selected portion of the spectrum to be analyzed;

a mode selector connected to the amplifier for applying thereto pulses from one of said detector and generating means;

first converting means for converting the heights of pulses applied thereto into corresponding digital pulse height value;

a biasing circuit connected to the amplifier for varying the base line of the amplified pulses and for applying the resulting pulses to the first converter means;

second converting means connected to the first converting means for converting the digital pulse height values into analogue values representative of one coordinate of a point on a spectrum and for converting the corresponding total number of occurrences into analogue values representative of the other coordinate value of a point on a spectrum; and display means connected to said second converting means for displaying the generated reference pulse and said coordinate values of a point on a spectrum.

3. Apparatus as in claim 2 wherein the second converting means comprises a digital to analogue converter connected to the display means and first converting means to convert the digital value of the generated reference pulse to a corresponding analogue value for display by said display means as the generated reference pulse display line and to convert the digital values of the pulse heights and the corresponding total number of occurrences of said pulse heights to corresponding analogue values representative of the coordinate values of a point on a spectrum.

UNITED STATES PATENT OFFICE
CERTIFICATE OF CORRECTION

Patent No. 3,568,054          Dated    March 2, 1971

Inventor(s)  Wallace A. Ross

It is certified that error appears in the above-identified patent and that said Letters Patent are hereby corrected as shown below:

Column 2, line 57, "made 2" should read -- mode 2 --;

Column 4, line 3, "value" should read -- values --; line 6, "converter" should read -- converting --.

Signed and sealed this 22nd day of June 1971.

(SEAL)
Attest:

EDWARD M.FLETCHER,JR.                WILLIAM E. SCHUYLER, JR.
Attesting Officer                    Commissioner of Patents

FORM PO-1050 (10-69)